Figure 5:
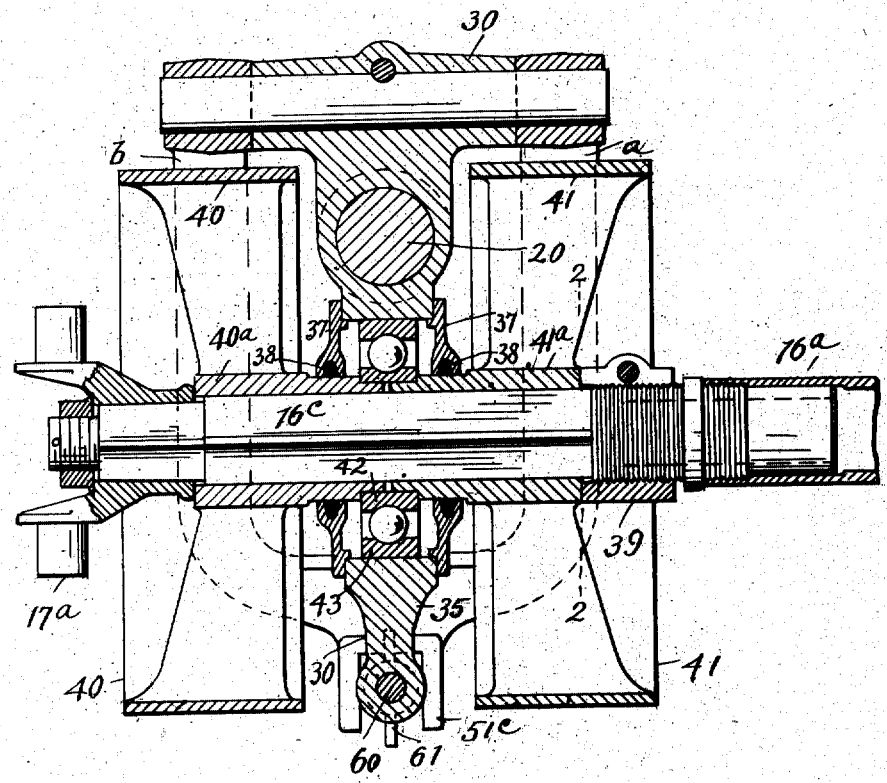

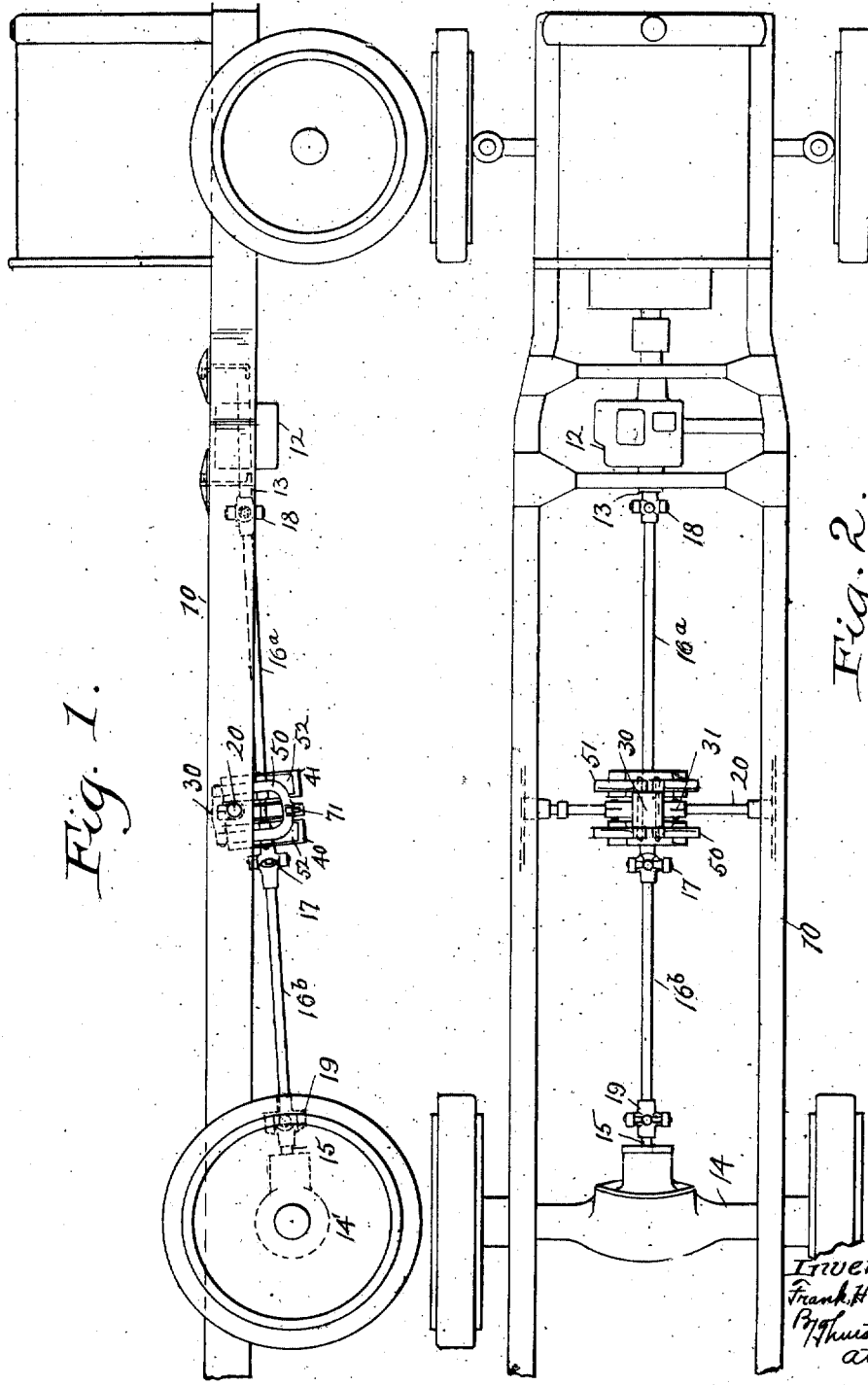

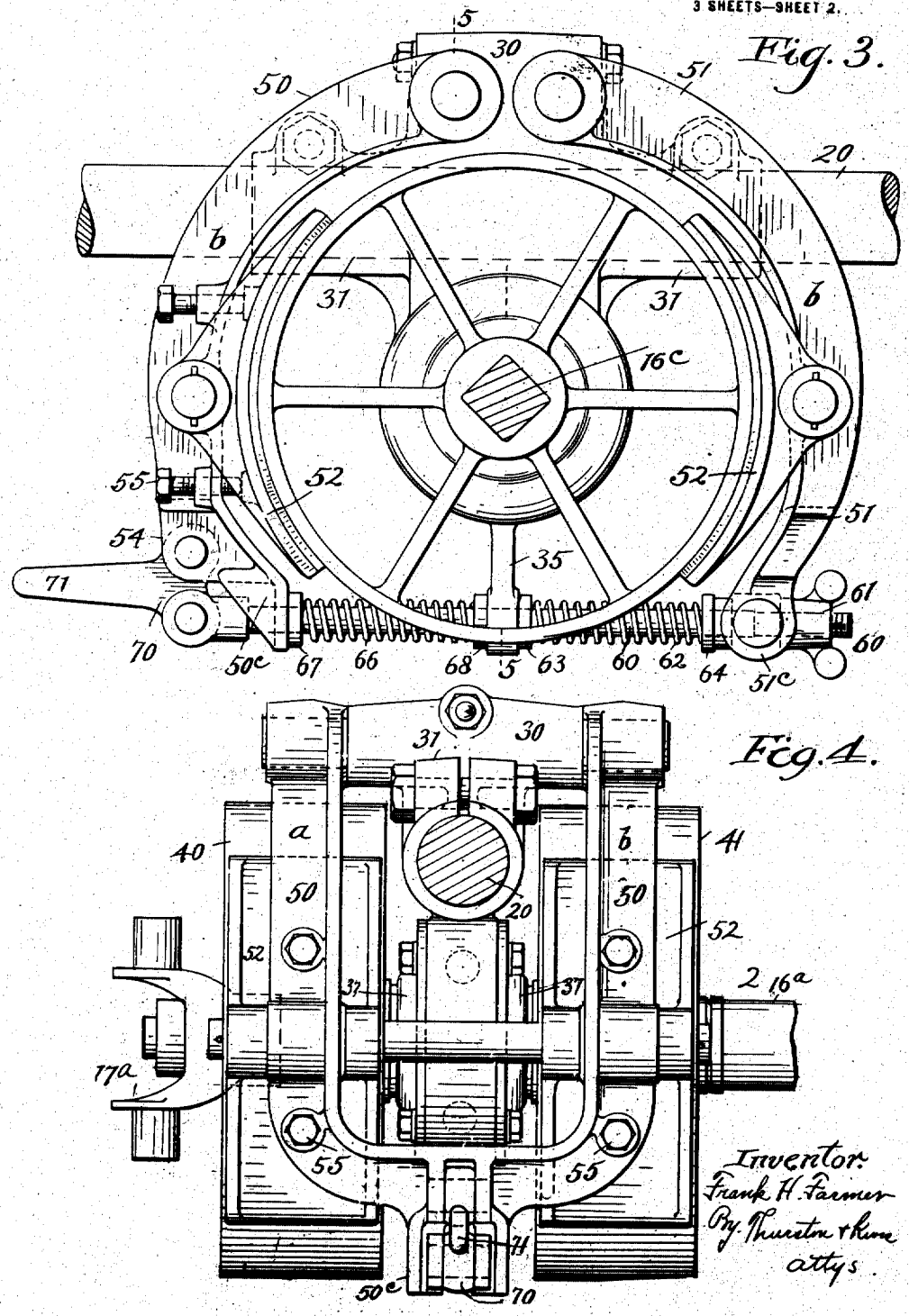

UNITED STATES PATENT OFFICE.

FRANK H. FARMER, OF CLEVELAND, OHIO, ASSIGNOR TO THE WHITE MOTOR COMPANY, OF CLEVELAND, OHIO, A CORPORATION OF OHIO.

BRAKE MECHANISM FOR MOTOR-VEHICLES.

1,282,401.   Specification of Letters Patent.   Patented Oct. 22, 1918.

Application filed November 16, 1917. Serial No. 202,404.

*To all whom it may concern:*

Be it known that I, FRANK H. FARMER, a citizen of the United States, residing at Cleveland, in the county of Cuyahoga and State of Ohio, have invented a certain new and useful Improvement in Brake Mechanism for Motor-Vehicles, of which the following is a full, clear, and exact description.

The object of this invention is two-fold, to wit, first, to apply braking action to a shaft which is a part of the power transmitting mechanism of a motor vehicle, and which is respectively connected at its ends by universal joints with a driving and a driven member of said power transmitting mechanism; and, second, to rotatably support said shaft intermediate of its ends regardless of the length of said shaft, or its inclination, or whether it be made of one section or of two or more suitably connected sections.

Mechanism having the double function stated is particularly useful in connection with motor trucks which have to be made of various lengths to suit different specific uses, because varying the length of the truck usually involves varying the length and inclination of such a power transmitting shaft as has been referred to. The invention is likewise useful in connection with a transmitting shaft of this sort which is long enough to have a tendency to whip or bend when in use, because it actually prevents such whipping or bending. It is also advantageous because it permits the use, for the stated purpose, of a shaft made in two sections which are operatively connected, preferably by a universal joint. Finally, it is very useful on trucks whose driving wheels and associated mechanism are of such sort that it is difficult to apply two brakes to each of such driving wheels.

The invention consists in the construction and combination of parts shown in the drawings and hereinafter described and pointed out definitely in the appended claims.

In the drawings, Figure 1 is a side elevation of so much of a motor car as is required to show the present invention applied thereto; Fig. 2 is a plan view of the mechanism shown in Fig. 1; Fig. 3 is an end view of the braking and shaft supporting mechanism of this invention, the propeller shaft being sectioned in the plane of line 2—2 on Fig. 5; Fig. 4 is a side elevation of the mechanism shown in Fig. 3, and Fig. 5 is a sectional side elevation of said mechanism in the plane indicated by line 5—5 on Fig. 3.

Referring to the parts by reference characters, 10 represents the chassis frame of the motor vehicle, as a whole. 12 represents the transmission gear case which is suitably supported on said frame. 13 represents the rear end of the terminal shaft of the transmission mechanism in said case. 14 represents the tubular rear axle casing which is to be connected in the usual or any suitable way with the chassis frame. 15 represents the forwardly projecting end of a longitudinal shaft mounted in said rear axle frame for driving the differential mechanism which is commonly contained therein. All of the foregoing corresponds with usual and conventional practice.

A so-called propeller shaft is commonly employed to transmit power from the shaft 13 to the shaft 15, or some equivalents of these two shafts. The propeller shaft, as shown in the drawing, is made of two sections 16$^a$, 16$^b$, which are connected, in approximate alinement, by a universal joint 17; and said propeller shaft as a whole is connected at its ends respectively by universal joints 18, 19, with the shafts 13 and 15. Said propeller shaft as a whole is unusually long, and is inclined downward from its front to its rear end. It will, however, be understood that this invention does not require that the propeller shaft be made of two connected sections, nor that it be unusually long, or that it be inclined. The invention, however, permits the successful use of a long jointed inclined propeller shaft and the application of braking action thereto, although obviously the invention may be applied to any propeller shaft regardless of its length or other characteristics referred to.

The combined brake mechanism and shaft supporting mechanism includes a brake frame 30 which is formed with a transversely extended split sleeve 31. This sleeve embraces and is supported by a cylindrical bar or tube 20 which, at its ends, is connected with the side members of the chassis frame at such points as will enable said brake frame to perform its functions, as hereinafter set forth.

The propeller shaft passes through and is rotatably supported by this brake frame. By properly locating the bar 20 and properly tipping the brake frame thereon, the mechanism carried by said brake frame may be associated with any part of the length of the propeller shaft; and when tipped to the proper angle the sleeve 31 of the brake frame is clamped upon said bar.

In the exemplification of the invention shown in the drawing this brake frame embraces the propeller shaft near the rear end of the front section thereof. The adjacent part 16$^c$ of said propeller shaft is squared; and the hubs 40$^a$, 41$^a$, of the brake drums 40, 41, are fitted upon said squared part and secured against endwise movement thereon.

The adjacent ends of these hubs are reduced in diameter, as shown, to form an annular recess to which is fitted the inner ring 42 of an antifriction ring bearing,—the outer ring 43 of which is fixed to and supported by the brake frame. The inner bearing ring serves to space apart the two hubs referred to; and said hubs and bearing ring are clamped between the hub of the universal joint member 17$^a$, which is fixed upon the rear end of said propeller shaft section, and a screw collar clamp 39 which screws onto the shaft member 16$^a$ just in front of the front drum hub.

Two dust washers 37 are fixed to the brake frame on opposite sides of the said ring bearing, and they, or rather, the packing rings 38 which they carry, embrace and slidingly fit said hubs.

Two curved brake levers 50, 51, are pivoted to the brake frame above the bar 20 on pivots which extend longitudinally of the chassis frame. These two brake levers extend down on opposite sides of the two brake drums; each of these brake levers has two curved arms $a$, $b$, which are respectively adjacent the two brake drums; and these two arms are merged together at their lower ends 50$^c$, 51$^c$, between the brake drums. Each arm $a$, $b$, of each brake lever has a brake shoe 52 pivoted to it for engagement with the adjacent brake drum. Each brake lever arm carries two adjustment screws 55 for engagement with its brake shoe above and below the pivot thereof, so that it may be properly positioned with respect to the adjacent brake drum.

Means are provided for drawing together the lower ends of these two brake levers so as to cause the brake shoes referred to to frictionally engage the two brake drums, said means also being of such character that, when such action is permitted, the lower ends of the two brake levers will be thrust apart so as to disengage the brake shoes from the brake drums. In the construction shown a transversely extended rod 60 goes through and is slidably supported by an arm 35 which extends downward from and is a part of the brake frame 30. At one end this rod goes loosely through a hole in the lower end 51$^c$ of the brake lever 51. The projecting end of this rod is threaded and an adjustment nut 61 is screwed thereonto into engagement with the outer face of the brake lever end 51$^c$. A coiled spring 62 embraces this rod and is compressed between two collars 63, 64, slidably mounted thereon, one of which engages the brake frame arm 35 and the other the inner face of the brake lever end 51$^c$. The opposite end of this rod passes through a slot in the brake lever end 50$^c$. An operating lever 70 is pivotally connected with the projecting end of this rod 60 and with an ear 54 which is a part of the brake lever 50; and this lever has an operating arm 71 to which may be applied any suitable mechanism for operating it for the purpose of causing the braking action of the described brake mechanism.

Another coiled spring 66 surrounds this rod and is compressed between two collars 67, 68, slidably mounted thereon, one of which engages the brake frame arm 35 and the other of which engages the inner face of the brake lever end 50$^c$.

Having described my invention, I claim:—

1. In a motor vehicle, the combination of a propeller shaft which is connected at its ends respectively by universal joints with a driving member and a driven member of the power transmitting mechanism, a brake frame supported by the vehicle frame, and rotatably supporting said propeller shaft, an adjacently placed brake drum fixed to said propeller shaft, and brake mechanism supported on said brake frame.

2. In a motor vehicle, the combination of a propeller shaft whose ends are respectively connected by universal joints with a driving and a driven member of the power transmitting mechanism, a brake frame fixed to the vehicle frame and rotatably supporting the propeller shaft, two brake drums fixed to said propeller shaft on opposite sides of said brake frame, brake levers pivoted to said brake frame and extending on opposite sides of the said two drums, two brake shoes mounted on each brake lever for engagement with the two brake drums, mechanism for drawing the free ends of said brake levers toward each other to cause the brake shoes to engage the brake drum, and means normally thrusting the levers apart to disengage the brake shoes from said brake drums.

3. In a motor vehicle, the combination of a longitudinally extending propeller shaft whose ends are respectively connected by universal joints with a driving and a driven member of the power transmitting mechanism, two brake drums fixed upon said propeller shaft, a brake frame through which said propeller shaft passes and which is connected to and supported by the vehicle frame, an antifriction ring bearing the inner ring of which embraces and is fixed to the hubs of both brake drums and the outer ring of which is supported by said brake frame, and brake mechanism supported on said brake frame.

4. In a motor vehicle, the combination of a longitudinally extended propeller shaft whose ends are respectively connected by universal joints with a driving and a driven member of the power transmitting mechanism, a transversely extended rod fixed to the vehicle frame, a brake frame having a sleeve which embraces and may be turned upon said rod, means to rigidly fasten said sleeve to said rod, antifriction bearings for said propeller shaft supported by said brake frame, a brake drum fixed to said propeller shaft and brake mechanism supported upon said brake frame.

5. In a motor vehicle, the combination of a longitudinally extended propeller shaft whose ends are respectively connected by universal joints with a driving and a driven member of the power transmitting mechanism, a brake frame which is connected with and supported by the vehicle frame and through which said propeller shaft passes, two brake drums fixed to said propeller shaft on opposite sides of said brake drum, an antifriction ring bearing whose inner ring embraces and is fixed to the hubs of both of said brake drums and whose outer ring is fixed to and supported by said brake frame, dust washers which are fixed to the brake frame and lie on opposite sides of said ring bearing and surround and engage the hubs of said brake drums, and brake mechanism mounted upon and supported by said brake frame for engaging both brake drums.

6. In a motor vehicle, the combination of a propeller shaft made of two sections connected together by a universal joint,—which propeller shaft at its ends is respectively connected by universal joints with a driving and a driven member of the power transmitting mechanism, a brake frame fixed to the vehicle frame and rotatably supporting one of said propeller shaft sections near the joint between the two sections, a brake drum fixed to the supported propeller shaft adjacent said brake frame, two brake levers pivoted to said brake frame and extending on opposite sides of said brake drum, a brake shoe mounted on each brake lever for engagement with said brake drum, and mechanism for drawing the free ends of said brake levers toward each other to cause the brake shoes to engage the brake drum and for normally thrusting the levers apart to cause the brake shoe to disengage the brake drum.

In testimony whereof, I hereunto affix my signature.

FRANK H. FARMER.

Witnesses:
    T. R. DAHL,
    H. C. McGORY.